(12) United States Patent
Bobenhausen

(10) Patent No.: US 7,118,272 B2
(45) Date of Patent: Oct. 10, 2006

(54) METHOD AND APPARATUS FOR OPTICALLY DETECTING AND LOCATING A FIRE IN AN ENCLOSED SPACE

(75) Inventor: Axel Bobenhausen, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/831,446

(22) Filed: Apr. 22, 2004

(65) Prior Publication Data

US 2004/0213320 A1    Oct. 28, 2004

(30) Foreign Application Priority Data

Apr. 26, 2003   (DE) ............................... 103 18 976

(51) Int. Cl.
*G01K 5/48* (2006.01)
*G01K 1/02* (2006.01)

(52) U.S. Cl. ................ 374/55; 374/187; 374/141; 116/216

(58) Field of Classification Search ............... 374/45, 374/55, 141, 187, 201; 116/102, 216
See application file for complete search history.

(56) References Cited

U.S. PATENT DOCUMENTS

| | | | | |
|---|---|---|---|---|
| 2,629,797 A | * | 2/1953 | Hardy | 337/327 |
| 3,753,256 A | * | 8/1973 | McDonald | 340/586 |
| 4,072,933 A | * | 2/1978 | Pun | 340/521 |
| 4,149,159 A | * | 4/1979 | Datwyler et al. | 340/587 |
| 4,676,025 A | * | 6/1987 | Mattscheck et al. | 49/477.1 |
| 5,153,722 A | * | 10/1992 | Goedeke et al. | 348/159 |
| 5,350,899 A | * | 9/1994 | Ishikawa et al. | 219/494 |
| 5,645,351 A | * | 7/1997 | Nakata et al. | 374/161 |
| 5,924,589 A | | 7/1999 | Gordon | |
| 6,371,213 B1 | * | 4/2002 | Smith et al. | 169/73 |
| 6,572,948 B1 | * | 6/2003 | Dykhoff | 428/76 |
| 6,818,248 B1 | * | 11/2004 | Grace | 427/208.2 |
| 2001/0046456 A1 | * | 11/2001 | Langer et al. | 422/179 |
| 2003/0093187 A1 | * | 5/2003 | Walker | 701/1 |
| 2003/0216484 A1 | * | 11/2003 | Phillips et al. | 521/50 |
| 2004/0000410 A1 | * | 1/2004 | Burns | 169/47 |

(Continued)

FOREIGN PATENT DOCUMENTS

DE    3612377    10/1987

(Continued)

OTHER PUBLICATIONS

Use of intumescent material as actuator for fire protection device. Schnekkenburger. Jun. 2006.*

*Primary Examiner*—Gail Verbitsky
(74) *Attorney, Agent, or Firm*—W. F. Fasse; W. G. Fasse

(57) ABSTRACT

Thermally reactive elements of an intumescent material that expands when heated above a trigger temperature are arranged in an enclosed space, e.g a freight compartment of an aircraft. An optical sensor in the enclosed space has a field of view encompassing the elements. An evolving fire heats one of the elements above the trigger temperature so the intumescent material expands. This expansion of the element is sensed by the optical sensor, for an early detection of the fire at temperatures substantially below 300° C. With the elements arranged in a predefined pattern, the location of the fire can be determined based on the element(s) that has/have expanded. The intumescent material may be an adhesive tape adhered onto the ceiling of the freight compartment. Light sources or optical targets arranged along lines of sight behind the elements enhance the unambiguous recognition of the thermally expanded condition of a respective element.

19 Claims, 1 Drawing Sheet

U.S. PATENT DOCUMENTS

2004/0084276 A1* 5/2004 Repic et al. .................. 193/34
2004/0157012 A1* 8/2004 Miller et al. ............... 428/34.1

FOREIGN PATENT DOCUMENTS

| | | |
|---|---|---|
| DE | 3917205 | 8/1990 |
| DE | 19757497 | 7/1999 |
| GB | 2107182 | 4/1983 |
| GB | 2277871 | 11/1994 |

\* cited by examiner

METHOD AND APPARATUS FOR OPTICALLY DETECTING AND LOCATING A FIRE IN AN ENCLOSED SPACE

PRIORITY CLAIM

This application is based on and claims the priority under 35 U.S.C. §119 of German Patent Application 103 18 976.9, filed on Apr. 26, 2003, the entire disclosure of which is incorporated herein by reference.

FIELD OF THE INVENTION

The invention relates to a method as well as an apparatus for optically detecting a fire, e.g. using a video or IR camera or sensor, in an enclosed space, for example in a freight or cargo compartment of an aircraft.

BACKGROUND INFORMATION

Fire verification systems are being developed for use in freight compartments of aircraft. Such systems, however, are not yet in actual practical use due to shortcomings and problems in the development thereof. Particularly, algorithms for automatically interpreting optically obtained information for determining whether a fire does or does not exist in the optically monitored space are not yet adequately developed to the required level of reliability. Furthermore, any such algorithms must still be tested for validity. Thus, it is estimated that optical fire verification systems will not be in actual use in aircraft freight compartments for the next two to six years, with respect to an automatic fire detection and verification by such a system. Instead, any such optical fire monitoring system would be expected to merely provide not much more than a video image of the freight compartment, whereby the pilots must then visually evaluate and interpret the obtained video image in order to determine or estimate whether or not there is a fire in the freight compartment. It is also essentially not possible with such conventional systems to precisely determine the location of a fire in the freight compartment. While the location of the fire can be visually estimated, the precision of such locating depends on the number of cameras being used in the system, and is thus very cost intensive. A further disadvantage of such known systems using CCD cameras is that only temperatures above about 300° C. can be visually detected and measured due to the wavelength dependence.

German Patent DE 39 17 205 C1 discloses a fire fighting apparatus for use in freight or cargo aircraft as well as passenger aircraft. This known apparatus comprises a fire extinguishing unit mounted on a carriage which is movably arranged along a rail extending longitudinally in the aircraft. Particularly, the fire extinguishing unit includes a fire extinguishing nozzle that is pivotably mounted on the carriage, and the carriage can be actively driven along the rail according to remote control commands from the cockpit of the aircraft. A video camera is coupled with the fire extinguishing unit such that the lens of the video camera monitors the area or space at which the fire extinguishing nozzle is directed. Thus, the pilot or other personnel in the aircraft can control the motion of the carriage along the rail, as well as the pivoting position of the fire extinguishing nozzle, and trigger the release of a fire extinguishing agent through the nozzle, while monitoring the area in front of the nozzle by means of a video image provided by the video camera. While such a system provides for the active combat and extinguishing of a fire in connection with video monitoring of an enclosed space, such a system is not suitable for detecting and locating an outbreak of a fire in the first place.

SUMMARY OF THE INVENTION

In view of the above, it is an object of the invention to provide a method and an apparatus of the above mentioned general type, with which the early recognition and locating of a fire can be achieved through optical detection, even for temperatures that are considerably below about 300° C. Another object of the invention is to achieve the automatic detection and locating of a fire through such optical detection, and/or to facilitate the visual evaluation of an optical image of the enclosed space by a pilot or other personnel to enable the human detection and locating of a fire in the enclosed space. The invention further aims to avoid or overcome the disadvantages of the prior art, and to achieve additional advantages, as apparent from the present specification. The attainment of these objects is, however, not a required limitation of the invention.

The above objects have been achieved according to the invention in an arrangement for optically detecting a fire in an enclosed space, such as a freight or cargo compartment of an aircraft, comprising one or more thermally reactive elements of a thermally intumescent material arranged in the enclosed space, and an optical monitoring system that has an optical field of view directed into the enclosed space and encompassing the one or more thermally reactive elements. The thermally intumescent material swells or expands upon being heated above a trigger temperature.

Particularly, the intumescent material has the property of foaming-up and thereby expanding in size and volume when it is heated above its trigger temperature, while remaining fire-resistant so as not to burn even at temperatures of an actual fire. The thermally reactive elements of the thermally intumescent material are preferably arranged in a prescribed pattern on the ceiling of the enclosed space. Each thermally reactive element is preferably a strip of the intumescent material in the form of an adhesive tape that can simply be self-adhered onto the ceiling of the enclosed space at the desired location. Alternatively, the thermally reactive element may comprise a strip of an intumescent paint as the intumescent material painted onto the ceiling of the enclosed space.

The above objects have further been achieved according to the invention in a method using the above mentioned arrangement to optically detect and locate a fire in the enclosed space. When the temperature at the respective location of any one of the thermally reactive elements reaches or exceeds the trigger temperature of the intumescent material of the respective thermally reactive element, this element will expand or particularly foam-up and thereby become noticeably enlarged. The optical monitoring system, by optically monitoring the pattern of thermally reactive elements, generates a signal (e.g. a video signal or simply an analog or digital signal representing the output of a single optical monitoring detector or pixel) that provides clear unambiguous information regarding whether the thermally reactive element is in its initial unexpanded condition or its expanded condition resulting from exposure to a temperature above the trigger temperature. This signal can be evaluated either automatically (e.g. by a computer algorithm or by evaluating circuitry) or visually by a person, in order to accurately and unambiguously detect the existence of a high-temperature condition at the location of the respective thermally reactive element. This further allows the conclusion to be drawn, that a fire exists at or near this location. By providing plural thermally reactive elements in a pre-specified pattern, the location of the fire in the enclosed space can be determined to the degree of accuracy depending on the number and spacing of the thermally reactive elements in the pattern.

A preferred embodiment of the inventive arrangement and method is to be used in a cargo or freight compartment of an aircraft as the enclosed space, with a plurality of cargo load units such as containers and/or pallets arranged in the freight compartment. The thermally reactive elements, e.g. the strips of adhesive intumescent material, are self-adhered onto the ceiling of the freight compartment at respective locations directly above the stowage positions of the cargo load units in a predefined pattern. If a fire erupts or begins to evolve in or near one of the cargo load units, e.g. in a particular container, the temperature above the container will rise to exceed the trigger temperature of the intumescent material of the respective thermally reactive element arranged at that location. Thus, this thermally reactive element will swell or foam-up and expand. This expansion can be readily detected by the optical monitoring system, whereby the location of the thermally reactive element that has been triggered will indicate the location of the subject container in which there is a fire.

Further embodiments or particular features of the invention are as follows.

To facilitate the automatic or visual recognition of the thermally triggered and thus expanded condition of a respective thermally reactive element, the inventive arrangement further includes a light source or an optically detectable target arranged in a line of sight with the respective thermally reactive element between the light source or target and the optical monitoring detector. Particularly the components are arranged so that, when the respective thermally reactive element is in its original non-triggered (unexpanded) condition, the light source or target is not blocked by the thermally reactive element and remains visible to the optical sensor. On the other hand, when the respective thermally reactive element is thermally triggered and thus expands, the expanded intumescent material then blocks the line of sight of the optical sensor to the light source or target, so that the optical sensor no longer "sees" the light source or target behind the expanded thermally reactive element. This makes a positive unambiguous recognition of the expanded condition of the thermally reactive element possible.

Preferably, the optical sensor may comprise a video camera, which may simultaneously monitor the entire pattern of the plural thermally reactive elements. Alternatively, the optical monitoring system can include one or more individual optical sensors, which each individually monitor only one thermally reactive element, with an individual light source or target arranged therebehind.

Preferably, the thermally intumescent material is an intumescent adhesive tape or strip, for example the material available under the name "PALUSOL" (™) from the company BASF AG in Germany. The intumescent material preferably has a triggering temperature well below 300° C., and particularly approximately 160° C. (e.g. ±10° C.).

A substantial advantage of the present invention is that a fire detection and locating can be achieved already at relatively low temperatures of approximately 160° C. Thus, a very early recognition of an outbreak of a fire becomes possible. Further fire extinguishing measures can then be deployed as appropriate. Also, the location of the fire within the freight compartment can easily be determined already at such low fire-induced temperatures. Another advantage of the invention is that it does not rely on the presence of smoke for detecting the fire. Thus, the inventive method and arrangement provide useful supplementation for existing fire detection systems, especially for the detection of fires resulting in low or no evolution of visible smoke. Namely, the inventive arrangement and method rely merely on the heat or temperature indicative of a fire. A further significant advantage of the invention is that it can be essentially immediately deployed in new aircraft as well as being retrofitted into existing aircraft, with immediately available technology, at a rather low cost and installation effort.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF A PREFERRED EXAMPLE EMBODIMENT AND OF THE BEST MODE OF THE INVENTION

Figure 1:
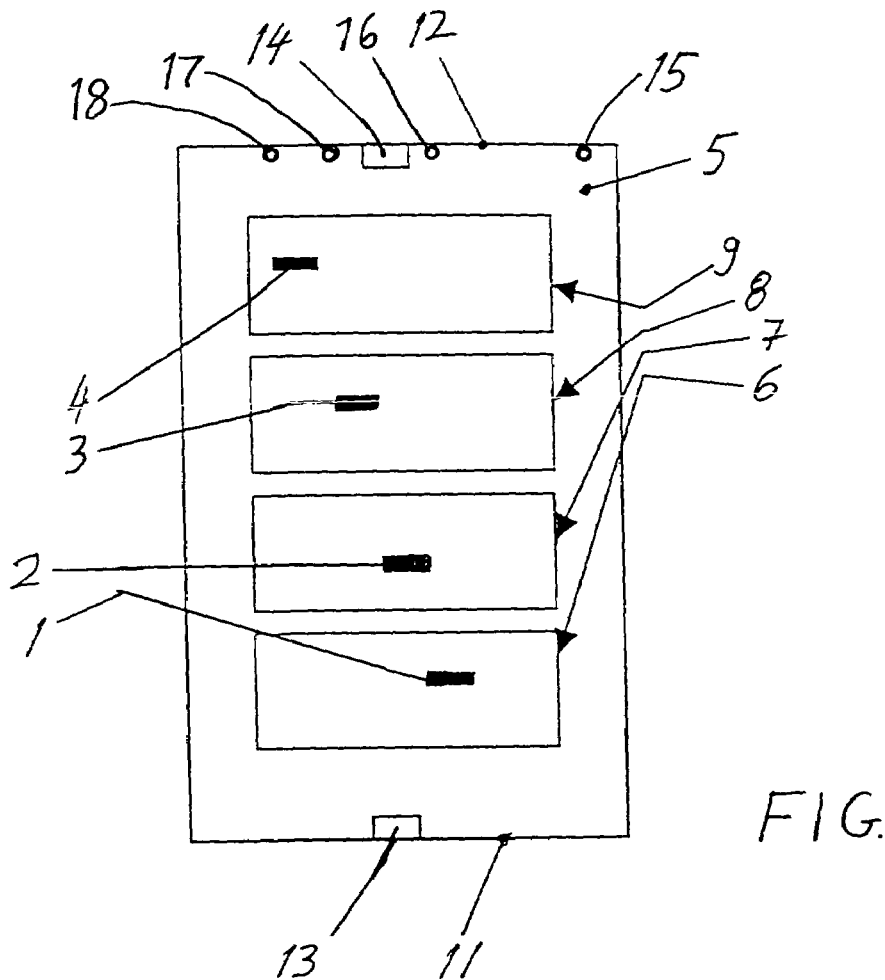
FIG. 1 is a schematic top plan view of the inventive arrangement for carrying out the inventive method in a freight compartment of an aircraft.

FIG. 1 schematically represents a top view onto or into a freight compartment 5 of an aircraft representing an enclosed space that is to be optically monitored for fire detection according to the invention. Four cargo load units such as cargo or freight pallets or especially containers 6, 7, 8 and 9 are arranged at respective stowage positions within the freight compartment 5. A plurality of thermally reactive elements, particularly being intumescent material strips 1, 2, 3 and 4, are arranged in a predefined pattern on the ceiling 10 of the freight compartment 5. Namely, one of these intumescent material strips 1, 2, 3 and 4 is respectively arranged above each one of the containers 6, 7, 8 and 9 on the ceiling 10.

In addition to being spaced from one another respectively above the containers in the longitudinal direction of the aircraft, the intumescent material strips 1, 2, 3 and 4 are transversely or laterally offset from one another or staggered, as will be described further below. Thus, the overall pattern involves four strips 1, 2, 3 and 4 arranged generally at spaced locations along a diagonal line on the ceiling 10, whereby this diagonal line or pattern extends at an acute angle relative to the longitudinal axis of the aircraft.

Figure 2:
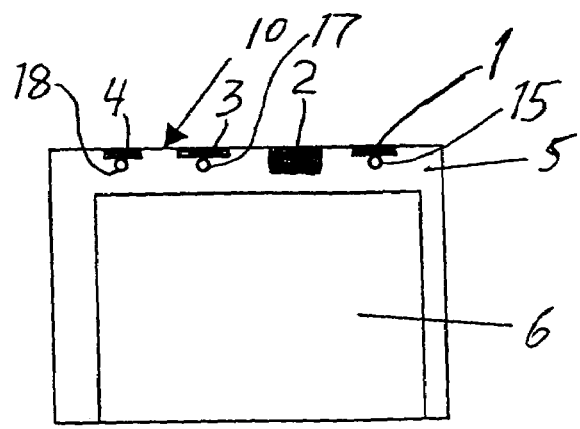
FIG. 2 is a schematic side view of the arrangement in the freight compartment according to FIG. 1, as seen within the field of view of a video camera as an optical monitoring sensor.

This pattern or arrangement of the intumescent material strips 1, 2, 3 and 4 above the containers on the ceiling 10 of the freight compartment 5 can also be seen in an end view in FIG. 2, in which only the first container 6 in the row of containers is visible, and the further containers 7, 8 and 9 are behind the visible container 6. This view of FIG. 2 represents a field of view of an optical sensor 13 as will be described below.

Each of the intumescent material strips 1 to 4 comprises a thermally intumescent material that expands or swells, and especially foams-up, when subjected to a temperature above a trigger temperature, such as about 160° C. A preferred intumescent material in this context is the above mentioned "PALUSOL" (™) material.

Furthermore, the inventive arrangement comprises an optical monitoring system including at least one optical monitoring sensor 13 and/or 14 arranged in the freight compartment 5 so as to visually monitor the intumescent strips 1, 2, 3 and 4. Particularly, in the present example embodiment, two optical monitoring sensors 13 and 14 are arranged on the opposite end walls 11 and 12 of the freight compartment 5. Each of these sensors 13 and 14 respectively comprises a video camera providing a visual light video image of the scene within its field of view, or an IR camera providing an infrared image of the scene within its field of view. The respective sensors 13 and 14 are preferably arranged near the ceiling 10 on the freight compartment end walls 11 and 12, with a field of view extending generally parallel to and along the ceiling 10 in the space between the containers 6 to 9 and the ceiling 10. Thereby, the sensors 13 and 14 respectively "see" the material strips 1 to 4 from the side thereof, for example providing a field of view or visual image as schematically represented in FIG. 2, from the sensor (e.g. camera) 13.

The pattern of the four intumescent material strips 1, 2, 3 and 4 can be seen in the top plan view of FIG. 1, which results in the side view as shown in FIG. 2. In this pattern, note that each intumescent material strip 1, 2, 3 or 4 is located at a unique distance from the sensor 13, and also a unique angular position relative to the vertex of the field of view of the sensor 13, in comparison to the positions of the three other material strips. Thus, the unique angular position of each respective material strip 1, 2, 3 or 4 is unambiguously linked to the unique distance of the respective material strip from the sensor or camera 13. As a result, the location including the distance of a respective material strip 1, 2, 3 or 4 is known even in a side view as seen by the camera or sensor 13, i.e. as shown in FIG. 2. Namely, based on the lateral positions corresponding to the angular positions of the material strips, it is known in the view of FIG. 2, that the material strip on the right side is the first material strip 1, and that the successive material strips 2, 3 and 4 are seen successively in order from the right to the left in the side view of FIG. 2. Correspondingly, even without express distance information, it is further known that the right-most material strip 1 corresponds to the closest distance, i.e. the location of the first container 6, while the successive strips 2, 3 and 4 respectively relate to the distances or locations of the successive containers 7, 8 and 9.

If a fire erupts in or around one of the containers 6, 7, 8 or 9, the heat of the fire will heat one or more of the intumescent material strips 1, 2, 3 or 4 above the trigger temperature of the intumescent material, thereby causing the respective strip to expand or swell, particularly by foaming-up. In this regard, the material strip closest to a location directly above the fire will be heated to above its trigger temperature earlier than the other strips (and the other strips might not even be heated to above the trigger temperature before a fire extinguishing system extinguishes the fire).

In the present example, there is a fire in or around the second container 7, which causes the second material strip 2 to swell or expand due to the heat of the fire. The swelled or expanded condition of the intumescent material strip 2 can be schematically seen in comparison to the initial unexpanded condition of the other strips 1, 3 and 4 in the side view of FIG. 2, as sensed or detected by the sensor 13. If a computer algorithm or a person monitoring the image signal output by the sensor (e.g. camera) 13 "sees" or recognizes the expanded condition of the material strip 2 in comparison to the original unexpanded condition of the strips, then the computer algorithm or the person can unambiguously conclude that there is a high-temperature condition, e.g. a fire, at the location of the material strip 2, corresponding to the location of the second container 7. In response thereto, the computer algorithm or the person can then trigger an appropriate fire extinguishing system or take other appropriate steps.

While the above description and the view of FIG. 2 relate to the sensor 13, it should be understood that the sensor 14 on the opposite end wall 12 of the compartment 5 operates in a similar manner, while simply providing the opposite view of the intumescent material strips 1, 2, 3 and 4. In this regard, the image information provided by the sensor 14 can be used for redundancy or for secondary configuration of the information provided by the sensor 13. Alternatively, the two sensors 13 and 14 could respectively detect different sets or groups of the thermally reactive elements.

In order to enhance the recognition ability of the expanded condition of the respective intumescent material strips 1, 2, 3 and 4, the inventive apparatus may further include light sources or optical targets 15, 16, 17 and 18 arranged on the end wall 12 opposite the sensor or camera 13. Particularly, the light sources or optical targets 15, 16, 17 and 18 are respectively arranged along lines of sight extending from the sensor 13 respectively along the individual material strips 1, 2, 3 and 4, at such a position so that the respective light source or optical target 15, 16, 17 or 18 is "visible" to the sensor 13 when the respective material strip 1, 2, 3 or 4 is in its initial unexpanded condition, but that the respective light source or optical target becomes partially or entirely blocked by the respective material strip in its expanded condition.

Thus, the sensor 13 can unambiguously sense whether the respective light source or optical target 15, 16, 17 or 18 remains visible in its field of view, or is blocked by an expanded condition of a respective one of the material strips 1, 2, 3 or 4. In the particular example presented here, in which a fire in or around the second container 7 has triggered the second material strip 2 to expand as shown in FIG. 2, the light sources or optical targets 15, 17 and 18 remain visible to the sensor 13, while the light source or optical target 16 is blocked by the expanded condition of the second material strip 2.

If the elements 15, 16, 17 and 18 are light sources, the inventive arrangement may use a corresponding plurality of individual light sensors arranged on the opposite wall 11, rather than the single camera 13. In such an embodiment, a single light sensor will be provided to establish an "electric eye" light barrier extending from a respective one of the light sources 15, 16, 17 or 18 to a respective one of the sensors, such that a respective allocated one of the intumescent material strips 1, 2, 3 or 4, when it swells to its expanded condition, will block the respective light barrier. As a further alternative, the light source may be arranged directly adjacent to the respective individual light sensor, and the elements 15, 16, 17 and 18 may then be reflective optical targets that reflect the light beam back to the sensor. This alternative embodiment similarly provides distance and location information based on which one of the light barriers has been interrupted or blocked by the respective associated intumescent material strip 1, 2, 3 or 4 that has swollen to its expanded condition.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for detecting a fire in an enclosed space, comprising:
   at least one thermally reactive element respectively arranged in said enclosed space and comprising a thermally intumescent material that undergoes an expansion in volume when heated above a trigger temperature; and
   an optical sensor arrangement arranged in said enclosed space and having an optical field of view encompassing said at least one thermally reactive element within said enclosed space, such that said expansion of said thermally intumescent material when said material is heated above said trigger temperature can be optically sensed by said optical sensor arrangement;
   wherein said at least one thermally reactive element comprises a plurality of said thermally reactive elements arranged in a dispersed pattern in said enclosed space with each respective element among said thermally reactive elements located at a respective unique distance and a respective unique angular position relative to a vertex of said field of view of said optical sensor arrangement so that each said element unambiguously links said respective unique angular position thereof to said respective unique distance thereof in said field of view.

2. The apparatus according to claim 1, wherein said optical sensor arrangement comprises a visual light video camera that provides a video signal of a visual light image of a scene including said at least one thermally reactive element sensed by said video camera in said field of view within said enclosed space.

3. The apparatus according to claim 1, wherein said optical sensor arrangement comprises an infrared camera that provides an image signal of an infrared light image of a scene including said at least one thermally reactive element sensed by said infrared camera in said field of view within said enclosed space.

4. The apparatus according to claim 1, further comprising a light source arranged in said enclosed space within said field of view, with one said thermally reactive element located along a line of sight between said optical sensor arrangement and said light source such that said optical sensor arrangement senses said light source along said line of sight when said thermally intumescent a material of said one thermally reactive element has not undergone said expansion and such that said light source is blocked behind said one thermally reactive element and thus not sensed by said optical sensor arrangement along said line of sight when said thermally intumescent material of said one thermally reactive element has undergone said expansion.

5. The apparatus according to claim 1, further comprising an optically discernible target arranged in said enclosed space within said field of view, with one said thermally reactive element located along a line of sight between said optical sensor arrangement and said optically discernible target such that said optical sensor arrangement senses said optically discernible target along said line of sight when said thermally intumescent material of said one thermally reactive element has not undergone said expansion and such that said optically discernible target is blocked behind said one thermally reactive element and thus not sensed by said optical sensor arrangement along said line of sight when said thermally intumescent material of said one thermally reactive element has undergone said expansion.

6. The apparatus according to claim 1, wherein said at least one thermally reactive element is arranged on a ceiling of said enclosed space.

7. The apparatus according to claim 1, wherein said a trigger temperature of said thermally intumescent material is below 300° C.

8. The apparatus according to claim 1, wherein said trigger temperature of said thermally intumescent material is about 160° C.

9. The apparatus according to claim 1, wherein said intumescent material has a property of foaming-up to cause said expansion in volume when heated above said trigger temperature.

10. The apparatus according to claim 1, wherein said thermally reactive element is a strip of an adhesive tape comprising said thermally intumescent material.

11. A combination including an apparatus for detecting a fire in an enclosed space, and an aircraft having a cargo or freight compartment bounding said enclosed space, with cargo load units selected from the group consisting of containers and pallets arranged in said enclosed space,
   wherein said apparatus comprises:
   at least one thermally reactive element respectively arranged in said enclosed space and comprising a thermally intumescent material that undergoes an expansion in volume when heated above a trigger temperature, and
   an optical sensor arrangement arranged in said enclosed space and having an optical field of view encompassing said at least one thermally reactive element within said enclosed space, such that said expansion of said thermally intumescent material when said material is heated above said trigger temperature can be optically sensed by said optical sensor arrangement; and
   wherein:
   said apparatus is for detecting a fire in said enclosed space in said cargo or freight compartment,
   said at least one thermally reactive element includes a plurality of said thermally reactive elements arranged in a prescribed pattern above said cargo load units in said cargo or freight compartment, and
   said optical sensor arrangement comprises at least one camera selected from the group consisting of visual light video cameras and infrared cameras arranged in said cargo or freight compartment and having said field of view directed to encompass said thermally reactive elements such that said expansion of said thermally intumescent material of at least one of said thermally reactive elements when said material is heated above said trigger temperature is optically sensed by said at least one camera and is represented in an image signal output by said at least one camera.

12. The combination according to claim 11, wherein said thermally reactive elements are respectively affixed on a ceiling of said cargo or freight compartment at respective locations respectively above said cargo load units, and said at least one camera is oriented with said field of view extending parallel to and along said ceiling in a space above said cargo load units and below said ceiling.

13. A method of using an apparatus for detecting a fire in an enclosed space in an aircraft,
   said apparatus comprising:
   at least one thermally reactive element respectively arranged in said enclosed space and comprising a thermally intumescent material that undergoes an expansion in volume a when heated above a trigger temperature, and an optical sensor arrangement arranged in said enclosed space and having an optical field of view encompassing said at least one thermally reactive element within said enclosed space, such that said expansion of said thermally intumescent material when said material is heated above said trigger temperature can be optically sensed by said optical sensor arrangement;

said method comprising the steps:

a) arranging said at least one thermally reactive element in said enclosed space;

b) upon the occurrence of a fire, heating said thermally intumescent material above said trigger temperature with heat from said fire, thereby expanding said thermally intumescent material;

c) optically monitoring said at least one thermally reactive element in said enclosed space using an optical monitoring system including said optical sensor arrangement, and thereby optically sensing said expanding of said thermally intumescent material; and d) in response to said sensing of said expanding of said thermally intumescent material, concluding that said fire exists in said enclosed space;

further comprising arranging a light source or an optical target behind a respective one said thermally reactive element along a line of sight of said optical sensor arrangement, wherein said step c) comprises sensing a change in a sensed image of said light source or said optical target along said line of sight before and after said expanding of said thermally intumescent material of said respective thermally reactive element.

14. The method according to claim 13, wherein said step a) comprises arranging a plurality of said thermally reactive elements in said enclosed space, and further comprising a step of determining a location of said fire in said enclosed space in response to and dependent on which one or ones of said thermally reactive elements is or are optically sensed as having undergone said expanding.

15. An apparatus for detecting a fire in an enclosed space, comprising:

at least one thermally reactive element respectively arranged in said enclosed space and comprising a thermally intumescent material that undergoes an expansion in volume when heated above a trigger temperature; and an optical sensor arrangement arranged in said a enclosed space and having an optical field of view encompassing said at least one thermally reactive element within said enclosed space, such that said expansion of said thermally intumescent material when said material is heated above said trigger temperature can be optically sensed by said optical sensor arrangement;

wherein said optical sensor arrangement includes a light sensor that has said field of view encompassing only a single said thermally reactive element and that is adapted to provide an analog or digital output signal indicating merely whether or not said thermally intumescent material of said single thermally reactive element has undergone said expansion.

16. The apparatus according to claim 15, further comprising a light source arranged in said enclosed space within said field of view, with said single thermally reactive element located along a line of sight between said light sensor and said light source such that said light sensor senses said light source along said line of sight when said thermally intumescent material of said single thermally reactive element has not undergone said expansion and such that said light source is blocked behind said single thermally reactive element and thus not sensed by said light sensor along said line of sight when said thermally intumescent material of said single thermally reactive element has undergone said expansion.

17. The apparatus according to claim 15, further comprising an optically discernible target arranged in said enclosed space within said field of view, with said single thermally reactive element located along a line of sight between said light sensor and said optically discernible target such that said light sensor senses said optically discernible target along said line of sight when said a thermally intumescent material of said single thermally reactive element has not undergone said expansion and such that said optically discernible target is blocked behind said single thermally reactive element and thus not sensed by said light sensor along said line of sight when said thermally intumescent material of said single thermally reactive element has undergone said expansion.

18. The apparatus according to claim 15, wherein said trigger temperature of said thermally intumescent material is below 300° C.

19. The apparatus according to claim 15, wherein said trigger temperature of said thermally intumescent material is about 160° C.

* * * * *

UNITED STATES PATENT AND TRADEMARK OFFICE
CERTIFICATE OF CORRECTION

| | |
|---|---|
| PATENT NO. | : 7,118,272 B2 |
| APPLICATION NO. | : 10/831446 |
| DATED | : October 10, 2006 |
| INVENTOR(S) | : Bobenhausen |

Page 1 of 1

It is certified that error appears in the above-identified patent and that said Letters Patent is hereby corrected as shown below:

<u>Title page</u>,
Item [56], References Cited, OTHER PUBLICATIONS,
Line 2, replace "Schnekkenburger" by --Schnekenburger--;

<u>Column 7</u>,
Line 47, after "intumescent", delete "a";

<u>Column 8</u>,
Line 4, after "said", delete "a";
Line 66, after "volume", delete "a";

<u>Column 9</u>,
Line 46, after "said", delete "a";

<u>Column 10</u>,
Line 32, after "when said", delete "a".

Signed and Sealed this

Third Day of April, 2007

JON W. DUDAS
*Director of the United States Patent and Trademark Office*